United States Patent [19]

Robinson

[11] 4,339,373

[45] Jul. 13, 1982

[54] GRANULATION AND DRYING AIDS FOR POLYMERIC GELS

[75] Inventor: Peter M. Robinson, Milford, Conn.

[73] Assignee: American Cyanamid Company, Stamford, Conn.

[21] Appl. No.: 119,232

[22] Filed: Feb. 6, 1980

[30] Foreign Application Priority Data

Mar. 2, 1979 [GB] United Kingdom ............... 7910668

[51] Int. Cl.³ .......................... C08K 5/01; C08J 3/12
[52] U.S. Cl. .................................. 524/521; 524/474; 524/522; 524/523; 525/217; 525/218; 525/221; 525/223; 528/486; 528/492; 528/496
[58] Field of Search ............... 260/33.6 UA, 29.6 PT, 260/34.2; 525/217, 218, 221, 223; 528/486, 492, 498

[56] References Cited

U.S. PATENT DOCUMENTS

| 3,041,318 | 6/1962 | Hess | 528/492 |
|---|---|---|---|
| 3,660,332 | 5/1972 | Kamio et al. | 528/486 |
| 3,828,012 | 8/1974 | Arndt et al. | 260/33.6 UA |
| 3,888,945 | 6/1975 | Arndt et al. | 528/486 |
| 3,905,122 | 9/1975 | Ohshima et al. | 34/17 |
| 3,915,909 | 10/1975 | Schnoring et al. | 528/486 |
| 3,956,218 | 5/1976 | Keppler et al. | 525/218 |
| 3,996,411 | 12/1976 | Ohshima et al. | 526/88 |
| 4,074,041 | 2/1978 | Nishikaji et al. | 260/29.6 PT |

FOREIGN PATENT DOCUMENTS 2557325 6/1977 Fed. Rep. of Germany ...... 528/492

OTHER PUBLICATIONS

Derwent Abst. 58868/C-34, May 28, 1980, (DL-14-1-931), "Granulating Water-Soluble Cellulose Deriv. . . .".
Derwent Abst. 73099 W/44, (Apr. 21, 1975), (J50044255), "Dehydrating Water-Contg. Water Soluble Polymers".
Derwent Abst. 29442 A/16, Mar. 7, 1978, (J53024381), "Dry, Acrylamide Polymer Prep. . . .".
Derwent Abst. 17179, Apr. 20, 1977, (SV546623), "Non-Cohering Polyacrylamide Granules . . .".

Primary Examiner—John C. Bleutge
Assistant Examiner—H. J. Lilling
Attorney, Agent, or Firm—Michael J. Kelly; Bruce F. Jacobs

[57] ABSTRACT

Polymeric soaps prepared from copolymers of hydrophobic monomers and hydrophilic monomers are useful as granulation and/or drying aids for polymeric gels, especially those gels of polyacrylamide.

24 Claims, No Drawings

GRANULATION AND DRYING AIDS FOR POLYMERIC GELS

This invention is directed to the use of polymeric soaps to improve the granulation and/or drying of polymeric gels.

In the conventional preparation of polyacrylamide polymers when dry particles are desired as opposed to emulsion-type products, there is considerable difficulty in producing free-flowing powders due to the inherent nature of the polyacrylamide particles to clump together or cake. As a result, there has been considerable research devoted to finding improved granulation and fluidization aids to replace the conventionally used products, i.e. sorbitan monolaurate, sorbitan tristerate, propylene glycol monostearate and the like.

Accordingly, it is an object of the present invention to produce free-flowing essentially dry powders from polymeric gels.

It is a further object to allow the direct drying of polyacrylamide-based gel particles during the preparation of anionic, nonionic and cationic flocculants.

In the present case, it has been found that by using a polymeric soap, prepared from one or more hydrophobic monomers and one or more hydrophilic monomers, dissolved in an oil, improved granulation and drying in fluidized bed driers occurs as compared to the previously used aids.

Accordingly, to the present invention there is provided a method of granulating, anticaking and/or fluidizing a polymeric gel comprising incorporating into said gel an effective amount of a polymeric soap which is an oil solution of a copolymer prepared from at least one hydrophobic monomer and at least one hydrophilic monomer.

The copolymer is suitably prepated from at least one hydrophobic monomer (Type A) and at least one hydrophilic monomer (Type B) in a monomer ratio of Type A: Type B in the range of about 1:3 to 3:1.

Typical Type A monomers may be represented by the formula:

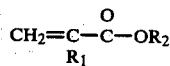

where $R_1$ is H or $CH_3$ and $R_2$ can be $C_4$–$C_{30}$, preferably $C_{10}$–$C_{27}$, hydrocarbon chain either branched or linear. Representative of Type A monomers are the fatty esters of methacrylic or acrylic acid containing ten or more carbon atoms in the ester group. Examples of these are lauryl acrylate and stearyl methacrylate.

Typical Type B monomers which may be anionic, nonionic or cationic may be represented by the following formulae:

anionic

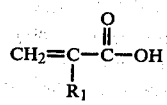

where
$R_1$ = H or $CH_3$ nonionic

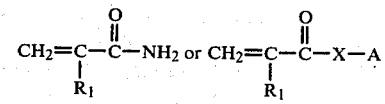

wherein
$R_1$ = H or $CH_3$
X = NH or O
A = $-(CH_2-CH_2O)_n-$H where n = 1 to 20 cationic

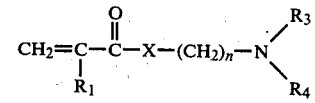

where
$R_1$ = H or $CH_3$
$R_3$ and $R_4$ are independently selected from $C_1$ to $C_4$ hydrocarbon
X = O or NH
n = 1 to 4

Representative of Type B monomers are the dialkylamino ethyl esters of acrylic or methacrylic acid, for example, diethylaminoethylacrylate, dimethylaminoethylmethacrylate or di-tertiary-butylaminoethylmethacrylate. Also included in this class are acrylic acid and methacrylic acid and their salts as well as acrylamide and methacrylamide. The Type B monomer may also be a polyethoxylated vinyl compound.

The most preferred range for the molar ratio of Type A: Type B monomers lies in the range of 1:2 to 2:1. The most effective ratio for a particular soap depends on the particular choice of monomers for the soap.

The polymeric soap used herein may be produced by solution polymerization in a common solvent for the monomers which may be all present initially or may be added continuously during the polymerization. The reaction may be initiated by a conventional free radical initiator such as azobisisobutyronitrile, 2',2'-azobis(2-amidino propane)hydrochloride, 2,2'-azobis(2,4-dimethyl valeronitrile), 4,4'-azobis(4-cyanopentanoic acid), lauroyl peroxide, benzoyl peroxide, tertiary alkyl peroxy esters such as tert-butyl perbenzoate and tert-butyl perpivalate, or by a reduction-oxidation initiation system such as hydroperoxide in conjunction with polyethylene polyamine.

Generally, the common solvent will be an oil so that the solvent need not be removed and the soap redissolved in an oil for use in the present invention. Suitable oils used herein are those mineral oils, fuel oils and lubricants which generally consist of hydrocarbons.

If the monomers are not all soluble in an oil, i.e., acrylamide, then the polymeric soaps may be prepared in some other suitable solvent, i.e., alcoholic solvents like butanol, the solvent then distilled off and the product dissolved in an oil.

The polymeric gels for which the present polymeric soaps are used to improve the granulation, anticaking and/or fluidization of are those which result from the polymerization of ethylenically-unsaturated monomers which are soluble in water to a greater or lesser extent and include such as (a) acrylic monomers, (b) vinyl alkyl esters and (c) vinyl sulfonic acid salts; examples of monomers falling within these three groups include, for example, acrylic acid, methacrylic acid, acrylamide, and esters and salts of acrylic acid and methacrylic acid, the alkyl and aminoalkyl esters of acrylic acid and methacrylic acid, e.g., methyl acrylate, ethyl acrylate, methyl methacrylate, ethyl methacrylate and diethylaminoethyl acrylate, mono esters of acrylic acid or methacrylic acid and a glycol, e.g., hydroxyethylmethacrylate, alkali metal and ammonium salts of acrylic acid and methacrylic acid, quaternaryammonium derivatives of aminoalkyl esters of acrylic acid and methacrylic acid, e.g., methyldiethylaminoethyl methosulfate, vinyl methyl ether, vinyl ethyl ether, and alkali metal and ammonium salts of vinyl sulfonic acid.

The gels generally will contain solids in the amount of about 5 to 75 percent, preferably 10 to 50 percent, and most preferably 25 to 35 percent, by weight.

The polymeric soaps may be added to the polymeric gels by merely blending small but effective amounts of the soaps onto or into the gels. Generally, suitable amounts are in the range of about 50 to 5,000 ppm., preferably 100 to 1000 ppm., and most preferably 250-500 ppm., of polymeric soap based on the polymeric gel.

Generally, anionic soaps should be used for anionic polymeric gels, cationic soaps for cationic gels, and nonionic soaps for any type gel though this has not appeared to be critical.

As stated above, the soaps are to be used dissolved in an oil. They should be dissolved so as to form solutions containing up to about 25 percent by weight solids, though this is not critical. More preferably, the solutions will contain about 1 to 15 percent by weight of the polymeric soaps.

The following non-limiting examples show the preparation of some polymeric soaps and their use in the present invention. All parts and percents are by weight unless otherwise specified.

EXAMPLE 1

Preparation of Stearyl Methacrylate/Methacrylic Acid Polymeric Soap

To a stirred reactor having a nitrogen sparge was charged 73.9 parts of oil (Gulfpar ® 300). The temperature was raised to and stabilized at 65°–70° C. To the hot oil was added the following premixture of monomers, initiator and chain transfer agent.

| | | |
|---|---|---|
| Stearyl methacrylate | 16.11 | parts |
| Methacrylic acid | 8.54 | parts |
| t-Butyl perpivalate | 1.23 | parts |
| 2-Mercaptoethanol | 0.21 | parts | over a period of about 3 hours with the temperature maintained at the 65°–70° C. At this point, another about 0.18 parts of t-butyl perpivalate initiator was added and the reaction mixture stirred for about 30 minutes to reduce the residual monomer content. The mixture was then heated to 80°–85° C. for about 2½ hours to finish the reaction.

The resultant product contained 24.64 percent by weight of a 1:2 copolymer of stearyl methacrylate (SMA) and methacrylic acid (MAA), 0.61 percent residual SMA; less than 0.02 percent residual MAA; no initiator; less than 0.05 percent 2-mercaptoethanol; and had a bulk viscosity at 25° C. of about 4000–5000 centipoise. When the product was diluted to 10% polymeric solids with further oil, the solution had a viscosity at 25° C. of 36–46 centipoise.

EXAMPLE 2

Preparation of Stearyl Methacrylate/Dimethylaminoethylmethacrylate Polymeric Soap The procedure of Example 1 was repeated using the following ingredients:

| | |
|---|---|
| Oil | 49.20 parts |
| Stearyl Methacrylate | 33.10 parts |
| Dimethylaminoethyl-methacrylate (DMAEMA) | 16.06 parts |
| t-Butyl perpivalate | 1.64 parts |

The resultant product contained 49.16 percent by weight of a 1:1 molar copolymer; less than 0.2 percent residual SMA; less than 0.1 percent residual DMAEMA; and had a bulk viscosity at 25° C. of about 1800–2200 centipoise. After dilution with additional oil to 10% polymeric solids, the viscosity at 25° C. was 15–25 centipoise.

EXAMPLE 3

Preparation of Stearyl Methacrylate/Acrylamide Polymeric Soap

The procedure of Example 1 was repeated to prepare a 1:2 molar ratio SMA:acrylamide copolymer except that instead of the oil, the reaction was performed in t-butanol.

The monomer charge was:

| | |
|---|---|
| Acrylamide | 4.55 parts |
| SMA | 10.40 parts |

Upon completion of the reaction, the t-butanol was distilled off and the polymeric product dissolved in the oil of Example 1.

EXAMPLE 4

By following the above procedures, various polymeric soaps were prepared having the compositions and soap polarity as specified in Table I below.

TABLE I

| Monomers | Mole Ratios | | | Soap Polarity |
|---|---|---|---|---|
| SMA:AMD | 1:1 | 1:2 | 2:1 | Nonionic |
| SMA:MAA | 1:1 | 1:2 | 2:1 | Anionic |
| SMA:DMAEMA | 1:1 | 1:2 | 2:1 | Cationic |
| SMA:DEAEA | 1:1 | 1:2 | 2:1 | Cationic |
| SMA:AA | 1:1 | 1:2 | 2:1 | Anionic |
| SMA:DMAEMA quaternized with dimethyl sulfate | 1:1 | 1:2 | 2:1 | Cationic |

SMA is stearylmethacrylate
AMD is acrylamide
MAA is methacrylic acid
DMAEMA is dimethylaminoethylmethacrylate
DEAEA is diethylaminoethylacrylate
AA is acrylic acid

EXAMPLE 5

To test the effectiveness of the polymeric soaps as granulating aids the following test was performed:

A copolymer of acrylamide and dimethylaminoethylmethacrylate quaternized with methyl chloride was prepared as a gel. The gel was cut into lumps of about 1 cubic foot. The lumps were then added to a feed hopper of a granulator along with 2000 ppm of a 10% oil solution of polymeric soap as prepared in Example 2.

The granulation rate obtained through a 3/16 inch×1/8 inch screen was 150 kg./hr. and the electrical demand was lower than expected.

The above was repeated without the polymeric soap and the electrical load on the granulator rapidly increased and the granulator ceased operating.

EXAMPLE 6

The procedure of Example 5 is repeated with various polymeric gels and the polymeric soaps as in Example 4 and comparable results are obtained.

EXAMPLE 7

To test the effectiveness of the polymeric soaps in preventing agglomeration of polymeric gels during the drying, the following test was performed.

A 2:1 molar ratio copolymer of acrylamide and sodium acrylate was prepared as a gel.

A portion of the gel was granulated in the absence of a polymeric soap and it was dried in a fluidized bed drier with the air at about 80° C. Shortly after the beginning of the drying, agglomeration of the particles occurred resulting in a caked mass which would not fluidize.

A second portion of the gel was granulated in the presence of 1500 ppm. of the polymeric soap of Example 1, as a 10% oil solution and was dried in a fluidized bed drier at 80° C. The resultant particles fluidized with essentially no agglomeration and yielded an essentially dry product.

EXAMPLE 8

The procedure of Example 7 was repeated except the molar ratio of acrylamide to sodium acrylate was varied to have from 0 to 100% sodium acrylate. Comparable results occurred in each case.

What is claimed is:

1. A method of granulating solid polymeric gels containing solids in the amount of about 5 to 75 percent of said gel to form a free flowing powder comprising adding to said solid gel during the granulation an effective amount of an oil solution of a polymeric soap in the range of about 50 to 5000 ppm of polymeric soap based in the polymeric gel, which soap is a copolymer prepared from at least one hydrophobic monomer and at least one hydrophilic monomer.

2. The method of claim 1 wherein said polymeric gel is a homopolymer or copolymer of one or more water-soluble ethylenically unsaturated monomers.

3. The method of claim 2 wherein said monomers are selected from acrylamide, methacrylamide, acrylic acid, methacrylic acid, salts of acrylic acid and methacrylic acid, and quaternized and unquaternized (neutralised and unneutralised) aminoalkyl esters of acrylic acid and methacrylic acid.

4. The method of claim 1 wherein the hydrophobic monomer is of the formula

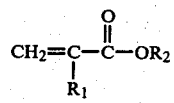

wherein R¹ is H or CH₃ and R₂ is a branched or linear hydrocarbon chain with about 4 to 30 carbon atoms.

5. The method of claim 4 wherein the hydrophobic monomer is stearyl methacrylate.

6. The method of claim 1 wherein the hydrophilic monomer is anionic and of the formula

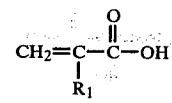

wherein $R_1$ is H or CH₃.

7. The method of claim 1 wherein the hydrophilic monomer is nonionic and of the formula selected from:

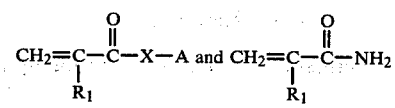

wherein $R_1$ is H or CH₃, X is NH or O, and A is $+CH_2CH_2+_nH$ where n is an integer from about 1 to 20.

8. The method of claim 7 wherein the nonionic monomer is selected from acrylamide and methacrylamide.

9. The method of claim 1 wherein the hydrophilic monomer is cationic and of the formula

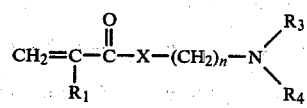

wherein $R_1$ is H or CH₃, $R_3$ and $R_4$ are independently selected from alkyl with about 1 to 4 carbon atoms, X is NH or O and n is an integer from about 1 to 4.

10. The method according to claim 9 wherein the cationic monomer is selected from quaternized and unquaternized (neutralised and unneutralised) dimethylaminoethylmethacrylate and diethylaminoethylacrylate.

11. The method according to claim 1 wherein the oil is a hydrocarbon oil.

12. The method according to claim 11 wherein the oil is a mineral oil.

13. A method of reducing agglomeration in the drying of granulated solid polymeric gels containing solids in the amount of about 5 to 75 percent of said gels to form a free flowing powder comprising adding to said solid gel prior to said drying an effective amount of an oil solution of a polymeric soap, in the range of about 50 to 5000 ppm of polymeric soap based on the polymeric gel, which soap is a copolymer prepared from at least one hydrophobic monomer and at least one hydrophilic monomer.

14. The method of claim 13 wherein said polymeric gel is a homopolymer or copolymer of one or more water-soluble ethylenically-unsaturated monomers.

15. The method of claim 14 wherein said monomers are selected from acrylamide, methacrylamide, acrylic acid, methacrylic acid, salts of acrylic acid and methacrylic acid, and quaternized and unquaternized (neutralised and unneutralised) aminoalkyl esters of acrylic acid and methacrylic acid.

16. The method of claim 13 wherein the hydrophobic monomer is of the formula

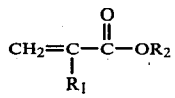

wherein $R_1$ is H or $CH_3$ and $R_2$ is a branched or linear hydrocarbon chain with about 4 to 30 carbon atoms.

17. The method of claim 16 wherein the hydrophobic monomer is stearyl methacrylate.

18. The method of claim 13 wherein the hydrophilic monomer is anionic and of the formula

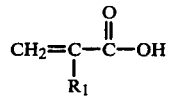

wherein $R_1$ is H or $CH_3$.

19. The method of claim 13 wherein the hydrophilic monomer is nonionic and of the formula selected from:

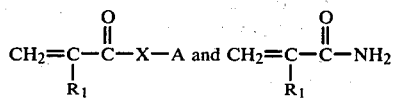

wherein $R_1$ is H or $CH_3$, X is NH or O, and A is $-(CH_2CH_2O)_n-H$ where n is an integer from about 1 to 20.

20. The method of claim 19 wherein the nonionic monomer is selected from acrylamide and methacrylamide.

21. The method of claim 13 wherein the hydrophilic monomer is cationic and of the formula

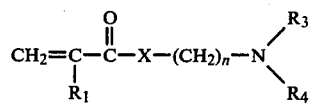

wherein $R_1$ is H or $CH_3$, $R_3$ and $R_4$ are independently selected from alkyl with about 1 to 4 carbon atoms, X is NH or O and n is an integer from about 1 to 4.

22. The method according to claim 21 wherein the cationic monomer is selected from quaternized and unquaternized (neutralised and unneutralised) dimethylaminoethylmethacrylate and diethylaminoethylacrylate.

23. The method according to claim 13 wherein the oil is a hydrocarbon oil.

24. The method according to claim 23 wherein the oil is a mineral oil.

* * * * *